United States Patent
Hu et al.

(10) Patent No.: US 10,860,857 B2
(45) Date of Patent: Dec. 8, 2020

(54) METHOD FOR GENERATING VIDEO THUMBNAIL ON ELECTRONIC DEVICE, AND ELECTRONIC DEVICE

(71) Applicant: Huawei Technologies Co., Ltd., Shenzhen (CN)

(72) Inventors: Guocheng Hu, Shenzhen (CN); Hongjie Yao, Shenzhen (CN); Ying Shi, Bellevue, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/346,031

(22) PCT Filed: Oct. 31, 2016

(86) PCT No.: PCT/CN2016/104142
§ 371 (c)(1),
(2) Date: Apr. 29, 2019

(87) PCT Pub. No.: WO2018/076380
PCT Pub. Date: May 3, 2018

(65) Prior Publication Data
US 2019/0318169 A1    Oct. 17, 2019

(51) Int. Cl.
*H04N 9/80* (2006.01)
*G06K 9/00* (2006.01)
(Continued)

(52) U.S. Cl.
CPC ...... *G06K 9/00711* (2013.01); *G06F 3/04817* (2013.01); *G06F 16/739* (2019.01)

(58) Field of Classification Search
CPC ............... G06K 9/00711; G06F 16/739; G06F 3/04817; G06F 3/04883; H04N 21/472
(Continued)

(56) References Cited

U.S. PATENT DOCUMENTS

2003/0178493 A1* 9/2003 Njolstad ............... G06F 3/0425
235/472.03
2011/0211802 A1 9/2011 Kamada et al.
(Continued)

FOREIGN PATENT DOCUMENTS

CN 103535023 A 1/2014
CN 103620682 A 3/2014
(Continued)

OTHER PUBLICATIONS

Yang, Weilong et al., "Improving YouTube video thumbnails with deep neural nets", Google AI Blog, Oct. 8, 2015, 3 pages.

*Primary Examiner* — Helen Shibru
(74) *Attorney, Agent, or Firm* — Slater Matsil, LLP

(57) ABSTRACT

Embodiments of the present invention provide a method for generating a video thumbnail on an electronic device and an electronic device. The method includes: receiving a play instruction from a user and displaying a played video on a screen of the electronic device; displaying, below the played video, a preview image corresponding to each video frame of the video; and after receiving a preview image selected by the user, generating a video thumbnail based on a video frame corresponding to the preview image. The embodiments of the present invention are applicable to the field of multimedia technologies.

14 Claims, 13 Drawing Sheets

(51) Int. Cl.
*G06F 16/738* (2019.01)
*G06F 3/0481* (2013.01)
(58) Field of Classification Search
USPC .......................................................... 386/241
See application file for complete search history.

(56) References Cited

U.S. PATENT DOCUMENTS

| | | | |
|---|---|---|---|
| 2011/0275416 A1 | 11/2011 | Chang et al. | |
| 2012/0293686 A1 | 11/2012 | Karn et al. | |
| 2014/0105500 A1 | 4/2014 | Karn et al. | |
| 2015/0293592 A1* | 10/2015 | Cheong | G06F 3/016 345/173 |
| 2015/0370455 A1* | 12/2015 | Van Os | G06F 3/04883 345/173 |
| 2018/0349019 A1* | 12/2018 | Eim | G06F 3/04817 |
| 2018/0356953 A1* | 12/2018 | Jang | G06F 3/04817 |
| 2018/0356972 A1* | 12/2018 | Wang | G06F 3/044 |
| 2019/0146651 A1* | 5/2019 | Williams | G06F 3/0485 715/720 |

FOREIGN PATENT DOCUMENTS

| | | |
|---|---|---|
| CN | 104219578 A | 12/2014 |
| CN | 105094513 A | 11/2015 |
| CN | 102541603 A | 12/2015 |
| CN | 105320436 A | 2/2016 |
| CN | 105872675 A | 8/2016 |
| WO | 2016038522 A1 | 3/2016 |

* cited by examiner

METHOD FOR GENERATING VIDEO THUMBNAIL ON ELECTRONIC DEVICE, AND ELECTRONIC DEVICE

CROSS-REFERENCE TO RELATED APPLICATIONS

This application is a national stage of International Application No. PCT/CN2016/104142, filed on Oct. 31, 2016, which is hereby incorporated by reference in its entirety.

TECHNICAL FIELD

Embodiments of the present invention relate to the field of multimedia technologies, and in particular, to a method for generating a video thumbnail on an electronic device and an electronic device.

BACKGROUND

With development of computers, Internet, and digital multimedia technologies, videos increase explosively. For massive videos, current research focuses on how a user can quickly obtain key video information. Obtaining key video information by generating a video thumbnail becomes popular in the current research.

Currently, a first frame of data in the video is extracted and decoded, to generate a video thumbnail. However, content of the first frame of data may not be able to present key content in the video. As a result, the foregoing method for generating a video thumbnail has a problem of incapability of presenting key video content.

SUMMARY

Embodiments of the present invention provide a method for generating a video thumbnail on an electronic device, and an electronic device, to resolve a prior-art problem that key video content cannot be presented when a video thumbnail is generated.

To achieve the foregoing objectives, the following technical solutions are used in the embodiments of the present invention:

In one aspect, an embodiment of the present invention provides a method for generating a video thumbnail on an electronic device. The method includes: receiving a play instruction from a user and displaying a played video on a screen of the electronic device; displaying, below the played video, a preview image corresponding to each video frame of the video; and after receiving a preview image selected by the user, generating a video thumbnail based on a video frame corresponding to the preview image. According to the method for generating a video thumbnail that is provided in this embodiment of the present invention, in this embodiment of the present invention, the electronic device may generate the video thumbnail based on the video frame selected by the user, to meet a requirement of the user on a customized video thumbnail. In this way, key content in the video can be presented and it is convenient for the user to manage video content, thereby improving user experience of a product.

In a possible implementation, after the receiving a preview image selected by the user, the method further includes: prompting, by the electronic device, the user to determine whether to generate a video thumbnail based on a video frame corresponding to the preview image; and the generating a video thumbnail based on a video frame corresponding to the preview image includes: if a received option of user input is "Yes", generating the video thumbnail based on the video frame corresponding to the preview image. That is, in this embodiment of the present invention, during generation of the video thumbnail, after the preview image selected by the user is received, it needs to be further determined whether to generate the video thumbnail based on the video frame corresponding to the preview image. The video thumbnail is generated based on the video frame corresponding to the preview image only when the user selects "Yes". Therefore, it is further ensured that the video thumbnail is generated based on a user requirement, user experience of a product is further improved.

In a possible implementation, the generating a video thumbnail based on a video frame corresponding to the preview image includes: storing the video frame corresponding to the preview image in a storage area of a folder corresponding to the video, to obtain the video thumbnail.

In another aspect, an embodiment of the present invention provides an electronic device. The electronic device includes an input device, a screen, and a processor. The input device is configured to receive a play instruction from a user. The screen is configured to display a played video. The screen is further configured to display, below the played video, a preview image corresponding to each video frame of the video. The processor is configured to, after receiving a preview image selected by the user by using the input device, generate a video thumbnail based on a video frame corresponding to the preview image.

In a possible implementation, the processor is further configured to, after receiving a preview image selected by the user by using the input device, prompt the user to determine whether to generate a video thumbnail based on a video frame corresponding to the preview image; and that the processor generates a video thumbnail based on a video frame corresponding to the preview image includes: the processor is configured to: if a received option of user input is "Yes", generate the video thumbnail based on the video frame corresponding to the preview image.

In a possible implementation, that the processor generates a video thumbnail based on a video frame corresponding to the preview image includes: the processor is configured to store the video frame corresponding to the preview image in a storage area of a folder corresponding to the video, to obtain the video thumbnail.

The electronic device provided in this embodiment of the present invention may be used to execute the foregoing method for generating a video thumbnail. Therefore, for technical effects that can be obtained by the electronic device, refer to the foregoing method embodiment. Details are not described herein again in this embodiment of the present invention.

In still another aspect, an embodiment of the present invention provides a method for generating a video thumbnail on an electronic device. The method includes: receiving a play instruction from a user, displaying a played video on a touchscreen of the electronic device; detecting a knuckle operation on the touchscreen; responding to the detected knuckle operation by determining a target frame corresponding to the knuckle operation; and generating a video thumbnail based on the target frame. According to the method for generating a video thumbnail that is provided in this embodiment of the present invention, in this embodiment of the present invention, the electronic device may generate the video thumbnail based on the video frame selected by the user, to meet a requirement of the user on a customized video thumbnail. In this way, key content in the video can be presented and it is convenient for the user to manage video content, thereby improving user experience of a product.

In a possible implementation, the determining a target frame corresponding to the knuckle operation includes: capturing and displaying 2N+1 video frames, where the 2N+1 video frames include a video frame obtained when the knuckle operation is identified, N consecutive video frames prior to the video frame, and N consecutive video frames following the video frame, and N is a positive integer; receiving a video frame selected by the user, where the video frame selected by the user is one of the 2N+1 video frames; and determining, as the target frame corresponding to the knuckle operation, the video frame selected by the user.

In a possible implementation, the determining a target frame corresponding to the knuckle operation includes: obtaining a video frame obtained when the knuckle operation is identified; and determining, as the target frame corresponding to the knuckle operation, the video frame obtained when the knuckle operation is identified.

In a possible implementation, the determining a target frame corresponding to the knuckle operation includes: pausing the video; receiving a video frame selected by the user when the user performs a frame-based drag operation on the video; and determining, as the target frame corresponding to the knuckle operation, the video frame selected by the user.

In a possible implementation, the generating a video thumbnail based on the target frame includes: storing the target frame in a storage area of a folder corresponding to the video, to obtain the video thumbnail.

In still another aspect, an embodiment of the present invention provides an electronic device. The electronic device includes an input device, a touchscreen, and a processor. The input device is configured to receive a play instruction from a user. The touchscreen is configured to display a played video. The processor is further configured to detect a knuckle operation on the touchscreen. The processor is further configured to: by determining a target frame corresponding to the knuckle operation response to the detected knuckle operation, and generate a video thumbnail based on the target frame.

In a possible implementation, that the processor determines a target frame corresponding to the knuckle operation includes: the processor is configured to: capture and display 2N+1 video frames, where the 2N+1 video frames include a video frame obtained when the knuckle operation is identified, N consecutive video frames prior to the video frame, and N consecutive video frames following the video frame, and N is a positive integer; receive, by using the input device, a video frame selected by the user, where the video frame selected by the user is one of the 2N+1 video frames; and determine, as the target frame corresponding to the knuckle operation, the video frame selected by the user.

In a possible implementation, that the processor determines a target frame corresponding to the knuckle operation includes: the processor is configured to: obtain a video frame obtained when the knuckle operation is identified; and determine, as the target frame corresponding to the knuckle operation, the video frame obtained when the knuckle operation is identified.

In a possible implementation, that the processor determines a target frame corresponding to the knuckle operation includes: the processor is configured to: pause the video; receive, by using the input device, a video frame selected by the user when the user performs a frame-based drag operation on the video; and determine, as the target frame corresponding to the knuckle operation, the video frame selected by the user.

In a possible implementation, that the processor generates a video thumbnail based on the target frame includes: the processor is configured to store the target frame in a storage area of a folder corresponding to the video, to obtain the video thumbnail.

The electronic device provided in this embodiment of the present invention may be used to execute the foregoing method for generating a video thumbnail. Therefore, for technical effects that can be obtained by the electronic device, refer to the foregoing method embodiment. Details are not described herein again in this embodiment of the present invention.

In conclusion, according to the method for generating a video thumbnail on an electronic device and the electronic device that are provided in the embodiments of the present invention, a requirement of a user on a customized video thumbnail can be met. In this way, key content in the video can be presented and it is convenient for the user to manage video content, thereby improving user experience of a product.

In still another aspect, an embodiment of the present invention provides a method for generating a video thumbnail on an electronic device. The method includes: receiving an end instruction of shooting a video; analyzing key content in the video, and capturing, based on the key content, at least one video frame that is in the video and that represents the key content; generating a video thumbnail of the video based on the at least one video frame; and storing the video thumbnail and the video in a memory in the electronic device. According to the method for generating a video thumbnail that is provided in this embodiment of the present invention, in this embodiment of the present invention, after the video shooting ends, the electronic device may generate the video thumbnail by analyzing the key content in the video, so that when a user opens a video library, the user sees a video thumbnail related to the key content in the shot video. In this way, the user can learn of general content or key content in the video before playing the video. Therefore, user experience is significantly improved.

In a possible implementation, the analyzing key content in the video specifically includes: using, as the key content, an object corresponding to a location of a focus in the shot video.

In still another aspect, an embodiment of the present invention provides an electronic device. The electronic device includes an input device, a processor, and a memory. The input device is configured to receive an end instruction of shooting a video. The processor is configured to analyze key content in the video, and capture, based on the key content, at least one video frame that is in the video and that represents the key content. The processor is further configured to generate a video thumbnail of the video based on the at least one video frame. The memory is configured to store the video thumbnail and the video.

In a possible implementation, that the processor analyzes key content in the video includes: the processor is configured to use, as the key content, an object corresponding to a location of a focus in the shot video.

The electronic device provided in this embodiment of the present invention may be used to execute the foregoing method for generating a video thumbnail. Therefore, for technical effects that can be obtained by the electronic device, refer to the foregoing method embodiment. Details are not described herein again in this embodiment of the present invention.

BRIEF DESCRIPTION OF THE DRAWINGS

FIG. 3-1 and FIG. 3-2 are a schematic diagram of a user operation of selecting a video frame according to an embodiment of the present invention;

FIG. 12-1 and FIG. 12-2 are still another schematic diagram of selecting a target frame by using a knuckle operation according to an embodiment of the present invention.

DETAILED DESCRIPTION OF ILLUSTRATIVE EMBODIMENTS

Figure 1:
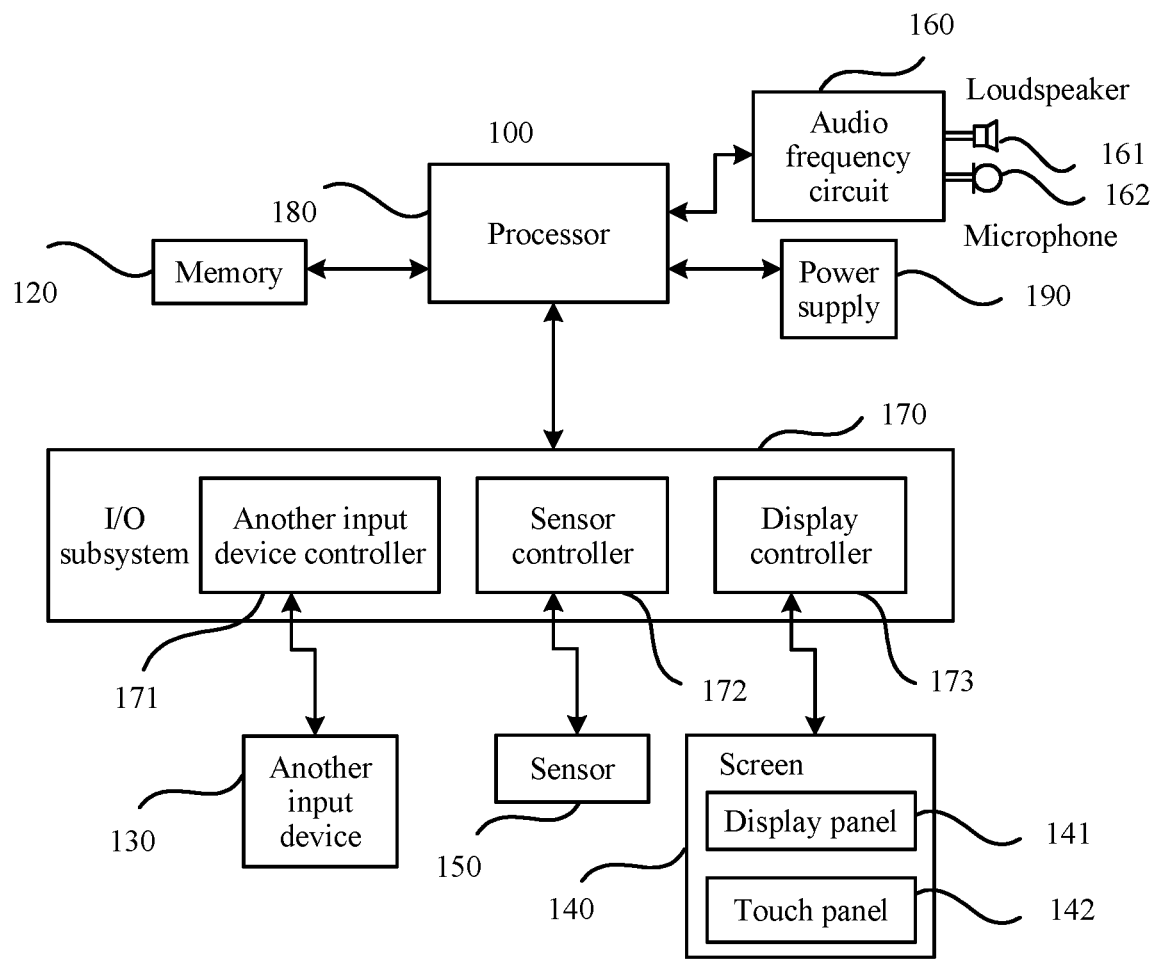
FIG. 1 is a schematic diagram of a hardware structure of an electronic device according to an embodiment of the present invention.

Descriptions of a technical feature, a beneficial effect, or a similar statement in the whole specification do not imply that all technical features and beneficial effects can be implemented in any single embodiment. However, it can be understood that a statement on a technical feature or beneficial effect means that at least one embodiment includes a specific technical feature or beneficial effect. Therefore, in this specification, descriptions of a technical feature, a beneficial effect, or a similar statement may not be specified to a same embodiment. In addition, technical features or beneficial effects described in the embodiments may be combined in any proper manner. A person skilled in the art may understand that a specific embodiment may be implemented without using one or more specific technical features or beneficial effects.

As described in the background, in the prior art, a first frame of data in a video is extracted and decoded, to generate a video thumbnail. However, content of the first frame data may not be able to present key content in the video. As a result, the foregoing method for generating a video thumbnail may have a problem of incapability of presenting key video content.

It should be noted that, in this specification, "/" means "or". For example, A/B may represent A or B. In this specification, "and/or" describes only an association relationship for describing associated objects and represents that three relationships may exist. For example, A and/or B may represent the following three cases: Only A exists, both A and B exist, and only B exists. "A plurality of" refers to two or more than two.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

It should be noted that, in the embodiments of the present invention, the word "exemplary" or "for example" is used to represent giving an example, an illustration, or a description. Any embodiment or design scheme described as an "exemplary" or "for example" in the embodiments of the present invention should not be explained as being more preferred or having more advantages than another embodiment or design scheme. Exactly, use of the word "exemplary" or "example" or the like is intended to present a related concept in a specific manner.

It should be noted that in the embodiments of the present invention, "a plurality of" means two or more unless otherwise stated. For example, a plurality of data packets are two or more data packets.

It should be noted that in the embodiments of the present invention, "of", "corresponding (corresponding, relevant)", and "corresponding" may be interchangeably used sometimes. It should be noted that, consistent meanings are expressed when differences are not emphasized.

As shown in FIG. 1, FIG. 1 is a diagram of a hardware structure of an electronic device 100 provided in an embodiment of the present invention. The electronic device 100 includes components such as a memory 120, another input device 130, a screen 140, a sensor 150, an audio frequency circuit 160, an I/O subsystem 170, a processor 180, and a power supply 190. It may be understood by a person skilled in the art that, a structure of the electronic device 100 shown in FIG. 1 does not constitute a limitation on an electronic device. A quantity of components included may be greater or less than those shown in the figure, or some components are combined, or some components are split, or arrangements of components are different. In addition, a person skilled in the art may understand that the screen 140 is a user interface (UI for short), and the electronic device boo may include more or fewer user interfaces than that shown in the figure.

The following describes each component of the electronic device 100 in detail with reference to FIG. 1.

The memory 120 may be configured to store a software program and a module. The processor 180 runs the software program and the module that are stored in the memory 120, to execute various function applications of the electronic device 100 and process data. The memory 120 includes a program storage area and a data storage area. The program storage area may store an operating system, an application program (such as a sound playing function or an image playing function) required by at least one function, or the like. The data storage area may store data (such as audio data or a phone book) created based on usage of the electronic device 100, or the like. In addition, the memory 120 may include a high-speed random access memory, and may further include a nonvolatile memory, such as at least one magnetic disk storage device, a flash memory device, or another volatile solid-state storage device.

The another input device 130 may be configured to: receive entered digital or character information, and generate key signal input related to user settings and function control of the electronic device 100. Specifically, the another input device 130 may include but is not limited to one or more of a physical keyboard, a function key (such as a volume control key or an on/off key), a trackball, a mouse, a joystick, or an optical mouse (the optical mouse is a touch-sensitive surface that does not display visual output, or an extension of a touch-sensitive surface formed by a touchscreen). The another input device 130 is connected to another input device controller 171 in the I/O subsystem 170, and exchanges a signal with the processor 180 under the control of the another input device controller 171.

The screen 140 includes a display panel 141 and a touch panel 142. The touch panel 142 is also referred to as a touchscreen, a touch-sensitive screen, or the like, and may collect a touch or non-touch operation of the user on or near the touch panel 142 (such as an operation performed by the user on or near the touch panel 142 by using any proper object or accessory such as a finger or a stylus, or a motion sensing operation, where the operation includes an operation type such as a single-point control operation or a multi-point control operation), and drive a corresponding connection apparatus according to a preset program. Optionally, the touch panel 142 may include two parts: a touch detection apparatus and a touch controller. The touch detection apparatus detects a touch location and a touch gesture of the user, detects a signal brought by a touch operation, and sends the signal to the touch controller. The touch controller receives touch information from the touch detection apparatus, converts the touch information into information that can be processed by the processor, and then sends the information to the processor 180 by using the I/O subsystem 170. The touch controller can receive, by using the I/O subsystem 170, and execute a command sent by the processor 180. In addition, the touch panel 142 may be implemented by using multiple types such as a resistive type, a capacitive type, infrared, and a surface acoustic wave, or may be implemented by using any future technology. Further, the touch panel 142 may cover the display panel 141. The user may perform, based on content displayed on the display panel 142 (the displayed content includes but is not limited to a soft keyboard, a virtual mouse, a virtual key, an icon, and the like), an operation on or near the touch panel 142 that covers the display panel 141. After the touch panel 142 detects the operation on or near the touch panel 141, the touch panel 142 sends the operation to the processor 180 by using the I/O subsystem 170 to determine user input. Then, the processor 180 provides, based on the user input, corresponding visual output on the display panel 141 by using the I/O subsystem 170.

It should be noted that although the touch panel 142 and the display panel 141 in FIG. 1 are used as two independent components to implement input and output functions of the electronic device 100, in some embodiments, the touch panel 142 and the display panel 141 may be integrated to implement the input and output functions of the electronic device 100. This is not specifically limited in this embodiment of the present invention.

The electronic device 100 may further include at least one sensor 150 such as a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the electronic device 100 moves to an ear. As a motion sensor, an accelerometer sensor may detect an acceleration value in each direction (generally, three axes), may detect a value and a direction of gravity when the accelerometer sensor is static, and may be used in an application for recognizing a posture (such as screen switching between landscape and portrait modes, a related game, or magnetometer posture calibration) of the electronic device, a function related to vibration recognition (such as a pedometer or a knock), or the like. For another sensor such as a gyroscope, a barometer, a hygrometer, a thermometer, or an infrared sensor that may be further disposed on the electronic device 100, details are not described herein.

The audio frequency circuit 160, the loudspeaker 161, and the microphone 162 may provide an audio interface between the user and the electronic device 100. The audio frequency circuit 160 may convert received audio data into a signal, and transmit the signal to the loudspeaker 161, and the loudspeaker 161 converts the signal into a sound signal for output. In addition, the microphone 162 converts a collected sound signal into a signal. The audio frequency circuit 160 converts the signal into audio data after receiving the signal, and then outputs the audio data to an RF circuit 110, to send the audio data to, for example, another electronic device, or output the audio data to the storage 120 for further processing.

The I/O subsystem 170 is configured to control an external input/output device, and includes the another input device controller 171, a sensor controller 172, and a display controller 173. Optionally, one or more other input device controllers 171 receive a signal from the another input device 130 and/or send a signal to the another input device 130. The another input device 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 171 may be connected to any one or more of the foregoing devices. The display controller 173 in the I/O subsystem 170 receives a signal from the screen 140 and/or sends a signal to the screen 140. After the screen 140 detects user input, the display controller 173 converts the detected user input into interaction with a user interface object displayed on the screen 140, to implement human-computer interaction. The sensor controller 172 may receive a signal from one or more sensors 150 and/or send a signal to one or more sensors 150.

The processor 180 is a control center of the electronic device 100, connects all parts of the entire electronic device 100 by using various interfaces and cables, and executes various functions of the electronic device 100 and processes data by running or executing the software program and/or the module stored in the memory 120 and invoking data stored in the memory 120, to perform overall monitoring on the electronic device 100. Optionally, for a more fluent processing speed, a storage unit may be disposed inside the processor 180. The storage unit is configured to store various operation instructions to be invoked by the processor 180. Optionally, the processor 180 may include one or more processing units. Preferably, an application processor and a modem processor may be integrated into the processor 180. The application processor mainly processes an operating system, a user interface, an application program, and the like. The modem processor mainly processes wireless communications. It can be understood that the modem processor may not be integrated into the processor 180.

The electronic device 100 further includes the power supply 190 (such as a battery) that supplies power to each component. Preferably, the power supply may be logically connected to the processor 180 by using a power supply management system, to implement functions such as charging management, discharging management, and power consumption management by using the power supply management system.

Optionally, the electronic device 100 may further include the radio frequency (RF for short) circuit 110. The RF circuit 110 may be configured to receive and send information or receive and send a signal during a call. The RF circuit usually includes an antenna, an amplifier, a transceiver, a coupler, a low noise amplifier, a duplexer, and the like. In addition, the RF circuit no may communicate with a network and another device through wireless communication. The wireless communication may use any communications standard or protocol, including but not limited to: Global System for Mobile Communications (GSM for short), Code Division Multiple Access (CDMA for short), general packet radio service (GPRS for short), Wideband Code Division Multiple Access (WCDMA for short), Long Term Evolution (LTE for short), an email, and a short message service (SMS for short).

Although not shown, the electronic device 100 may further include a camera 131, a Bluetooth apparatus 132, a menu key 133, and the like. Details are not described herein.

It should be noted that the electronic device in this embodiment of the present invention may be a mobile phone (or be referred to as a "cellular" phone), a tablet computer, or any device that has the foregoing function modules. This is not specifically limited in this embodiment of the present invention.

Figure 2:
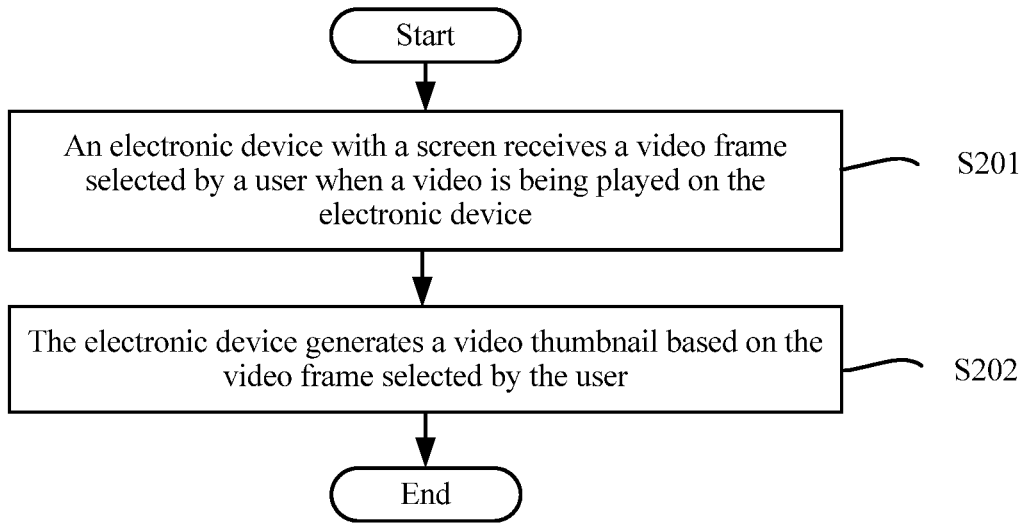
FIG. 2 is a schematic flowchart of a method for generating a video thumbnail according to an embodiment of the present invention.

FIG. 2 is a schematic flowchart of a method for generating a video thumbnail according to an embodiment of the present invention. The method for generating a video thumbnail is applied to the electronic device 100, and includes the following steps:

S201. An electronic device with a screen receives a video frame selected by a user when a video is being played on the electronic device.

S202. The electronic device generates a video thumbnail based on the video frame selected by the user.

Figures 1, 3:
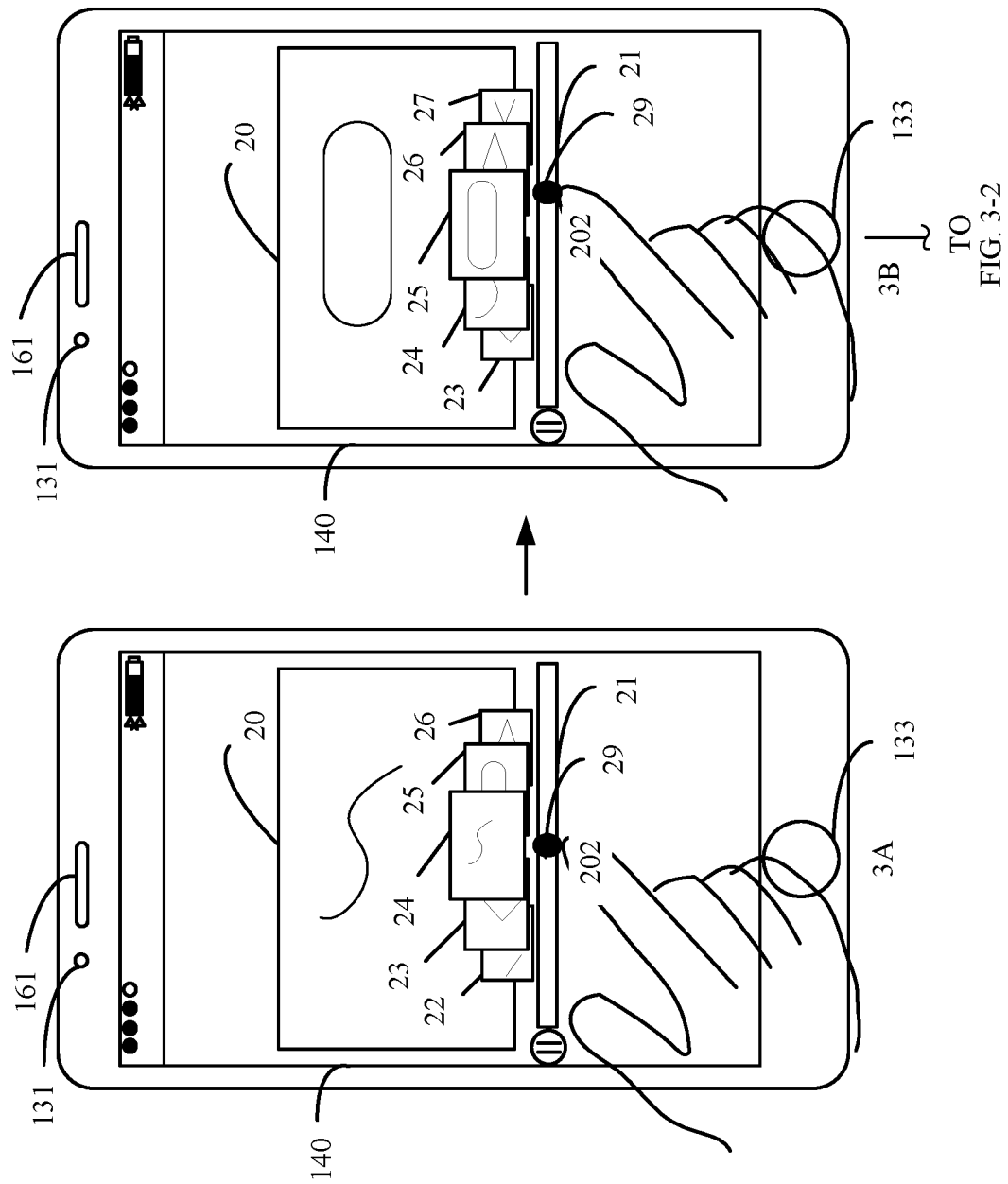
Figures 2, 3:
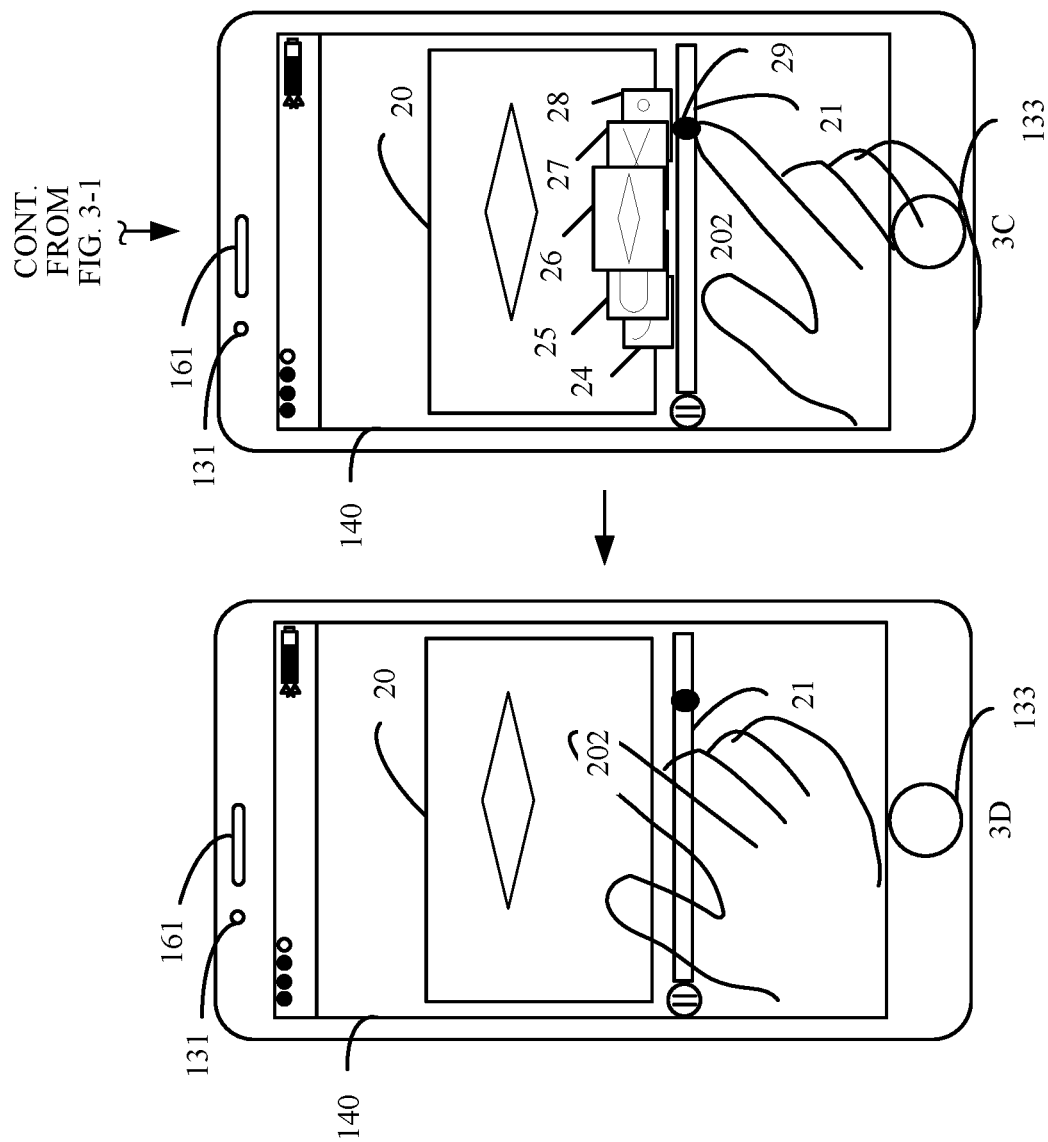

For example, step S201 in this embodiment of the present invention is described as follows:

For example, the electronic device is specifically a mobile phone. As shown in FIG. 3-1 and FIG. 3-2, when a video is being played on a mobile phone with a screen 140, a video playing area 20 may display a currently played video frame. For example, in FIG. 3A, the video playing area 20 may display a currently played video frame 24. As shown in FIG. 3B and FIG. 3C, with progressing of a video progress bar 21, the video playing area 20 may separately display a currently played video frame 25 and a currently played video frame 26.

If the video frame 26 played in the video playing area 20 in FIG. 3C is a video frame of interest to the user, as shown in FIG. 3D, the user may select the video frame 26 by using a finger 202 or another input device. The mobile phone may receive the video frame selected by the user, and generates a video thumbnail based on the video frame selected by the user. The another input device may be a mouse or a stylus. This is not specifically limited in this embodiment of the present invention.

In FIG. 3-1 and FIG. 3-2, when the finger 202 of the user pulls a key 29 on the video progress bar 21, a currently played video frame and several video frames prior to and several video frames following the video frame may be displayed above the video progress bar 21. For example, in FIG. 3A, a video frame 22, a video frame 23, the video frame 24, the video frame 25, and the video frame 26 may be displayed; in FIG. 3B, the video frame 23, the video frame 24, the video frame 25, the video frame 26, and a video frame 27 may be displayed; in FIG. 3C, the video frame 24, the video frame 25, the video frame 26, the video frame 27, and a video frame 28 may be displayed. Once the finger 202 leaves the key 29, as shown in FIG. 3D, no corresponding video frame is displayed above the video progress bar 21.

For example, step S202 in this embodiment of the present invention is described as follows:

That the electronic device generates a video thumbnail based on the video frame selected by the user may specifically include: storing, by the electronic device, the video frame selected by the user in a storage area of a folder corresponding to the video, to obtain the video thumbnail.

According to the method for generating a video thumbnail that is provided in this embodiment of the present invention, in this embodiment of the present invention, the electronic device may generate the video thumbnail based on the video frame selected by the user, to meet a requirement of the user on a customized video thumbnail. In this way, key content in the video can be presented and it is convenient for the user to manage video content, thereby improving user experience of a product.

Figure 4:
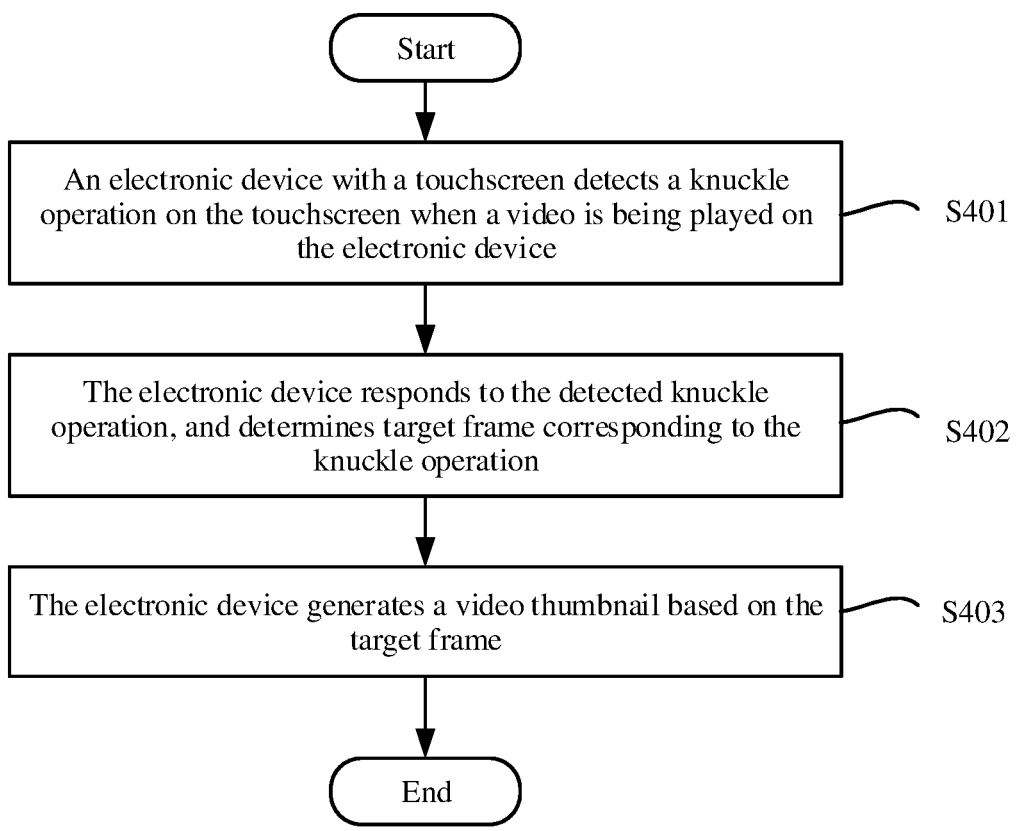
FIG. 4 is a schematic flowchart of another method for generating a video thumbnail according to an embodiment of the present invention.

Optionally, an embodiment of the present invention further provides a method for generating a video thumbnail and the method is applied to the electronic device 100. As shown in FIG. 4, the method includes the following steps:

S401. An electronic device with a touchscreen detects a knuckle operation on the touchscreen when a video is being played on the electronic device.

S402. The electronic device determines a target frame corresponding to the knuckle operation response to the detected knuckle operation.

S403. The electronic device generates a video thumbnail based on the target frame.

Specifically, step S401 in this embodiment of the present invention is described as follows:

The electronic device may detect, by using a sensor, a user operation on the screen, extract knuckle feature data, and identify a knuckle operation action by using a corresponding algorithm.

A knuckle operation action is usually defined by a manufacturer or a user. For example, several knuckle operation actions may be defined as follows: Continuously knocking a screen by using a knuckle means a full-screen screenshot; continuously sliding on a screen by using a knuckle means a partial screenshot; drawing any complete pattern on a screen by using a knuckle may enter a screenshot editing mode or change a shape of a screenshot; writing a letter on a screen by using a knuckle may enable a correspondingly specified software program on the electronic device; and the like. How to define a knuckle operation action is not specifically limited in this embodiment of the present invention.

Figure 5:
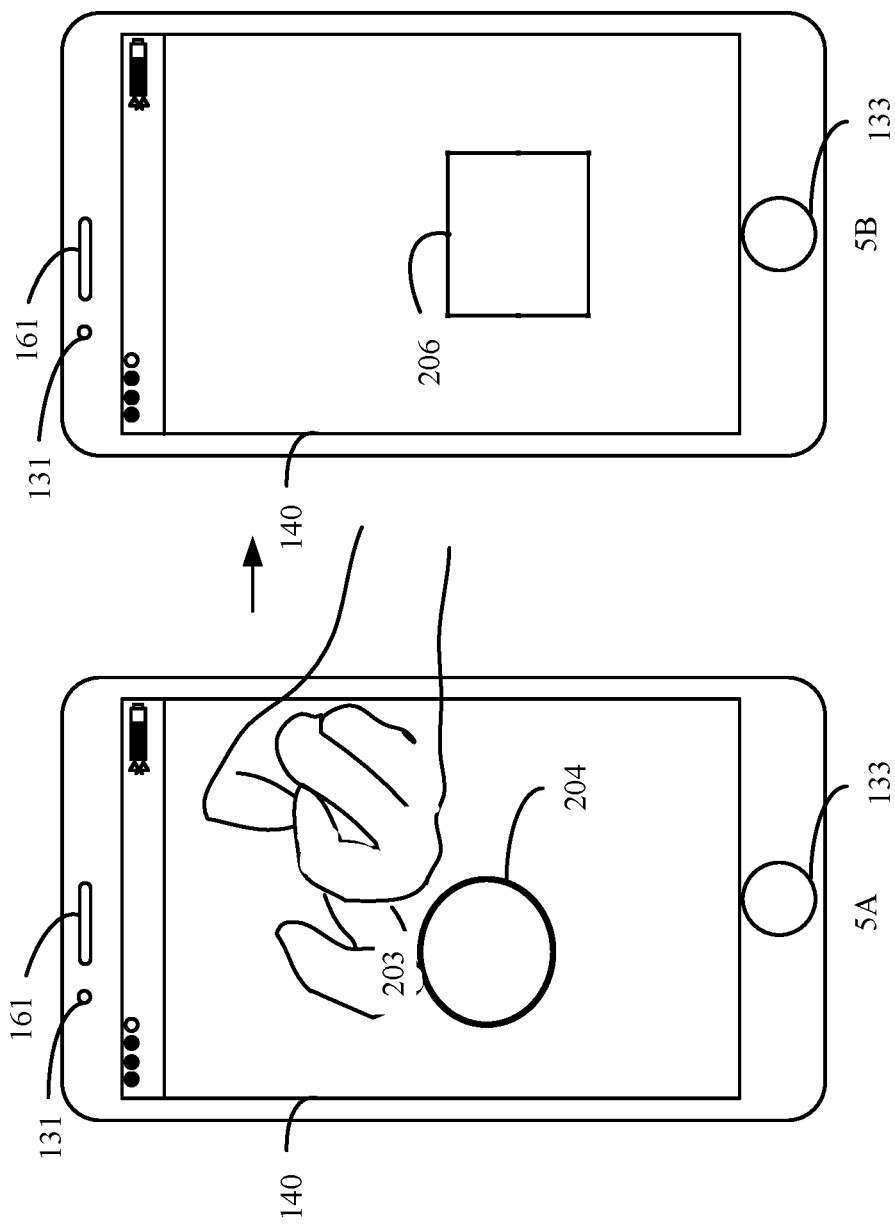
FIG. 5 is a schematic diagram of a knuckle operation according to an embodiment of the present invention.

For example, as shown in FIG. 5A, when a user uses a knuckle 203 to draw a complete circle 204 on a screen 140, based on the foregoing defined knuckle operations, the electronic device may enter the screenshot editing mode if the electronic device detects the knuckle operation. FIG. 5B is a schematic diagram of the screenshot editing mode. That is, a rectangular frame 206 displayed on the screen 140 in FIG. 5B may be used for screenshot editing.

Optionally, when the electronic device detects a knuckle operation, personal identification may be performed based on a knuckle feature, to ensure security of an electronic device operation. For example, a knuckle print may be identified. A knuckle print includes skin covering a joint at a proximal end of a finger. For example, a knuckle print may be identified in the following manner: First, an image collection unit in the electronic device captures an image of a human knuckle print, and extracts a region-of-interest (ROI for short) image $I_{ROI}$ based on local convexity of the knuckle print. Then, an expanded Gabor phase coding solution is used to extract, from the ROI image $I_{ROI}$, a feature of an orientation line of the image of the knuckle print, and the extracted feature is illustrated by using a competitive coded picture. At last, an angular distance between competitive coded pictures is compared with a reference value in a database to identify a person. A manner in which the electronic device performs personal identification based on a knuckle feature is not specifically limited in this embodiment of the present invention.

Specifically, step S402 in this embodiment of the present invention is described as follows:

When the user performs a knuckle operation, the knuckle operation may not fall into a video playing area. Therefore, in this embodiment of the present invention, after the electronic device detects a knuckle operation on the touchscreen, the electronic device may first determine whether the knuckle operation is performed on the video playing area. If the knuckle operation is not performed on the video playing area, the electronic device determines that the knuckle operation is not a video thumbnail extraction operation. If the knuckle operation is performed on the video playing area, step S402 is performed. In this way, some operations that are not for video thumbnail extraction can be filtered out, to ensure accuracy of generating a video thumbnail.

Figure 6:
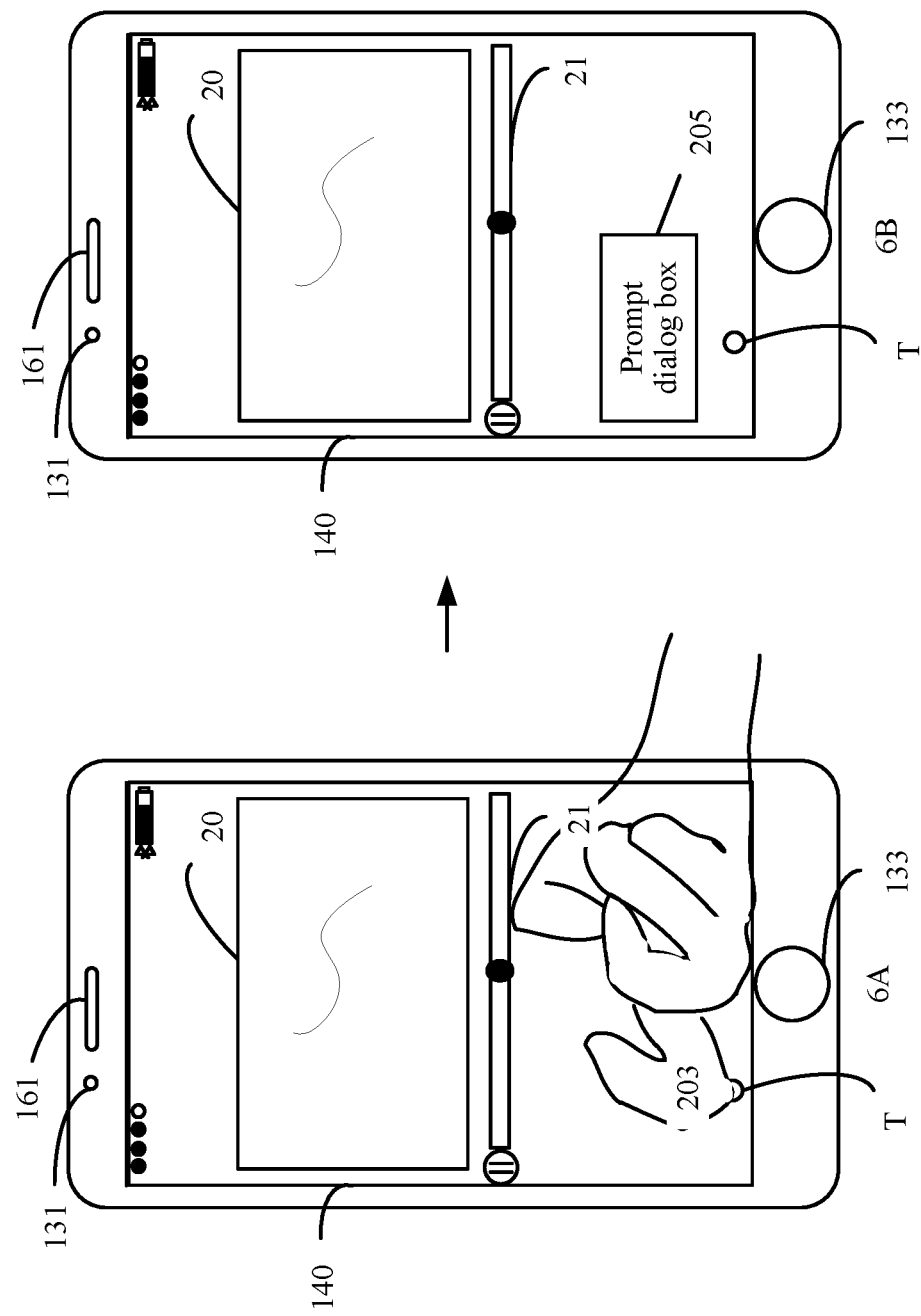
FIG. 6 is a schematic diagram of another knuckle operation according to an embodiment of the present invention.

For example, as shown in FIG. 6A, it is assumed that the user performs a knock operation on an area T on the screen 140 by using the knuckle 203. Because the area T does not belong to the video playing area 20, the knock operation performed by the knuckle 203 on the area T on the screen 140 does not fall into the video playing area 20. The electronic device can further determine that the knuckle operation is not a video thumbnail extraction operation. Optionally, as shown in FIG. 6B, a prompt dialog box 205 may pop up in a location corresponding to the area T on the electronic device, to remind the user that a knuckle operation corresponding to the location is not a video thumbnail extraction operation.

Specifically, step S403 in this embodiment of the present invention is described as follows:

That the electronic device generates a video thumbnail based on the target frame may specifically include: storing, by the electronic device, the target frame in a storage area of a folder corresponding to the video, to obtain the video thumbnail.

According to the method for generating a video thumbnail that is provided in this embodiment of the present invention, in this embodiment of the present invention, when the electronic device detects a knuckle operation on the touchscreen, a target frame corresponding to the knuckle operation may be determined, to generate a video thumbnail based on the target frame. The video thumbnail is generated based on the target frame corresponding to the knuckle operation on the touchscreen, and the knuckle operation is triggered by the user. Therefore, the method for generating a video thumbnail provided in this embodiment of the present invention can meet a requirement of the user on a customized video thumbnail. In this way, key content in the video can be presented and it is convenient for the user to manage video content, thereby improving user experience of a product.

Figure 7:
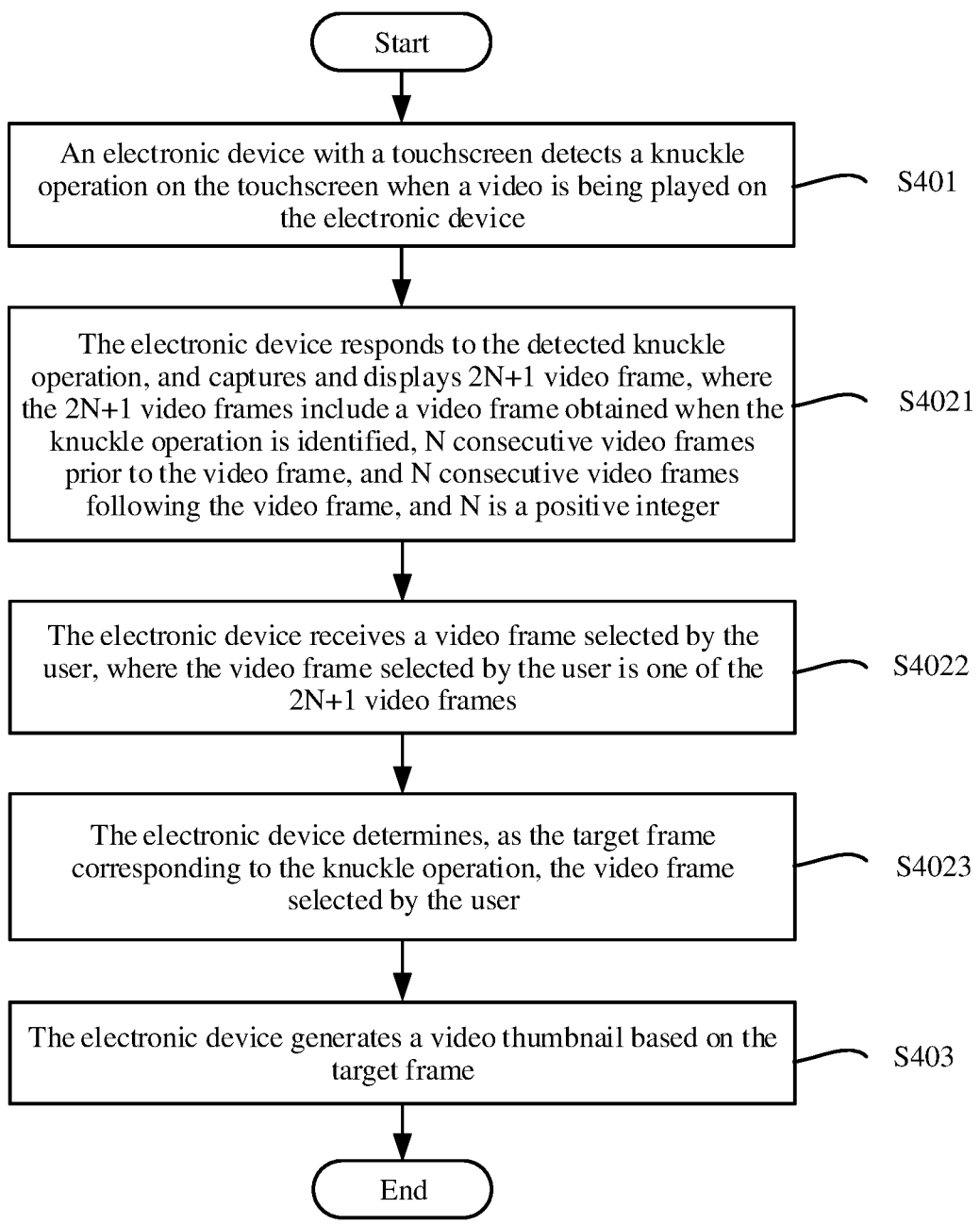
FIG. 7 is a schematic flowchart of still another method for generating a video thumbnail according to an embodiment of the present invention.

Optionally, in another implementation, as shown in FIG. 7, step S402 may specifically include the following steps:

S4021. The electronic device captures and displays 2N+1 video frame response to the detected knuckle operation, where the 2N+1 video frames include a video frame obtained when the knuckle operation is identified, N consecutive video frames prior to the video frame, and N consecutive video frames following the video frame, and N is a positive integer.

S4022. The electronic device receives a video frame selected by the user, where the video frame selected by the user is one of the 2N+1 video frames.

S4023. The electronic device determines, as the target frame corresponding to the knuckle operation, the video frame selected by the user.

For example, it is assumed that the electronic device is specifically a mobile phone. As shown in FIG. 8A, when a user operates a mobile phone with a screen 140 to play a video, a video playing area 20 may display a currently played video frame. For example, in FIG. 8A, the video playing area 20 may display a currently played video frame 24. If the video frame 24 is an image of interest to the user after seeing the image, the user may perform a knuckle operation in an area S in the video playing area 20, for example, continuously knock the area S by using the knuckle 203. In this way, after responding to the detected knuckle operation, the electronic device may capture and display five consecutive video frames for the user to select from. The five consecutive video frames may be shown in FIG. 8B and include the video frame 24, two consecutive video frames (a video frame 22 and a video frame 23) prior to the video frame 24, and two consecutive video frames (a video frame 25 and a video frame 26) following the video frame 24. Further, after seeing the five captured video frames on the screen 140, the user may select one of the video frames based on the user's preference, for example, the video frame 25 shown in FIG. 8B. In this way, the video frame selected by the user and received by the electronic device is the video frame 25. Further, the electronic device may determine the video frame 25 as the target frame corresponding to the knuckle operation.

As shown in FIG. 8B, the user may tap or press a captured video frame by using the finger 202 to select a preferred video frame. Certainly, the user may click or press a captured video frame by using an external device to select a preferred video frame. For example, the external device may be a mouse. An operation manner in which the user selects a video frame is not specifically limited in this embodiment of the present invention.

The electronic device captures and displays the 2N+1 video frames for the user to select from. This is compatible with a delay of a user operation action, so that a video frame entered by the user meets a requirement of the user more properly.

Figure 8:
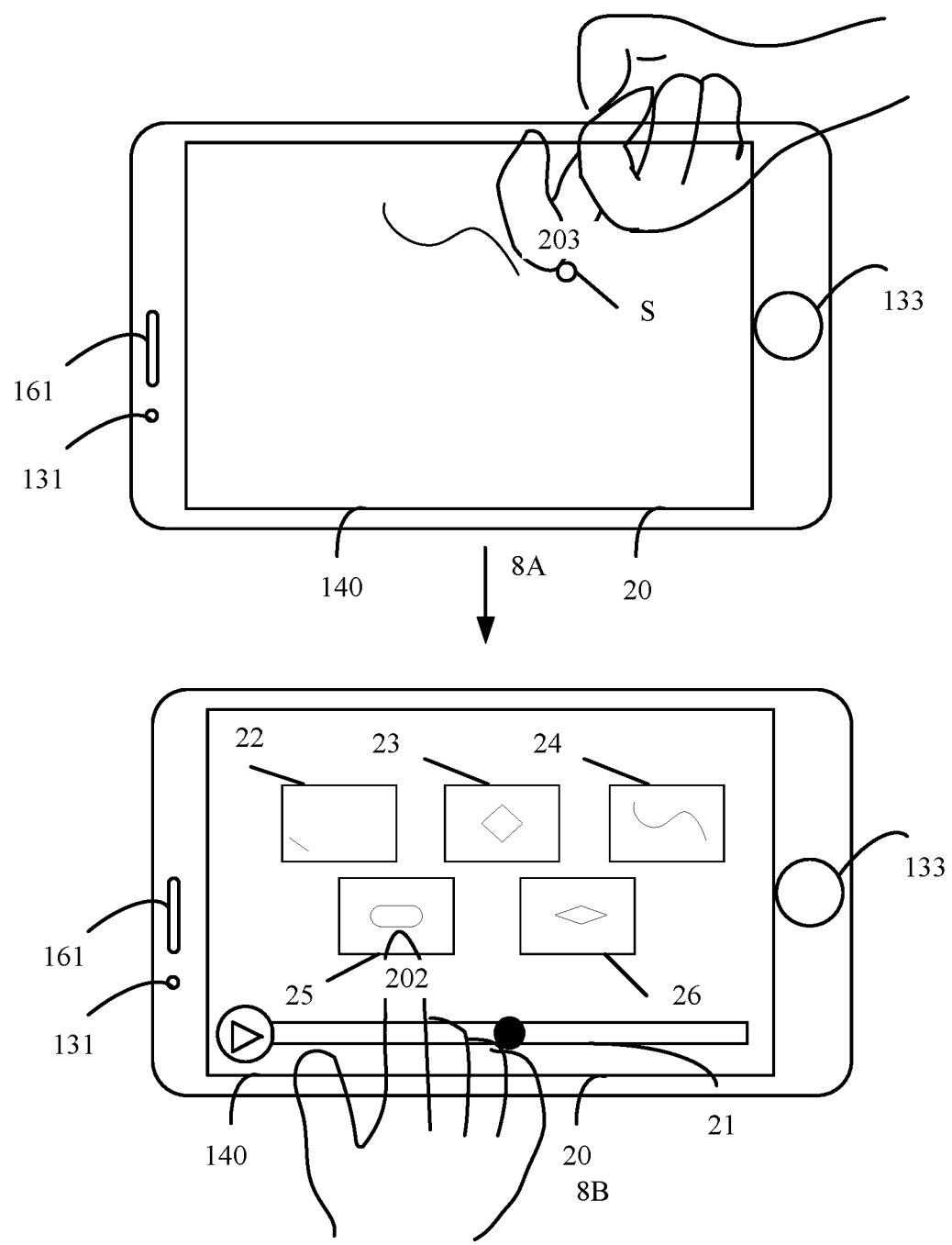
FIG. 8 is a schematic diagram of selecting a target frame by using a knuckle operation according to an embodiment of the present invention.

It should be noted that the mobile phone in the embodiment shown in FIG. 8 is placed horizontally, and therefore the video playing area 20 and the screen 140 may be corresponding to a same area. Certainly, as shown in FIG. 3-1 and FIG. 3-2, the mobile phone may be placed vertically, and the video playing area 20 and the screen 140 may be corresponding to different areas. This is not specifically limited in this embodiment of the present invention.

Figure 9:
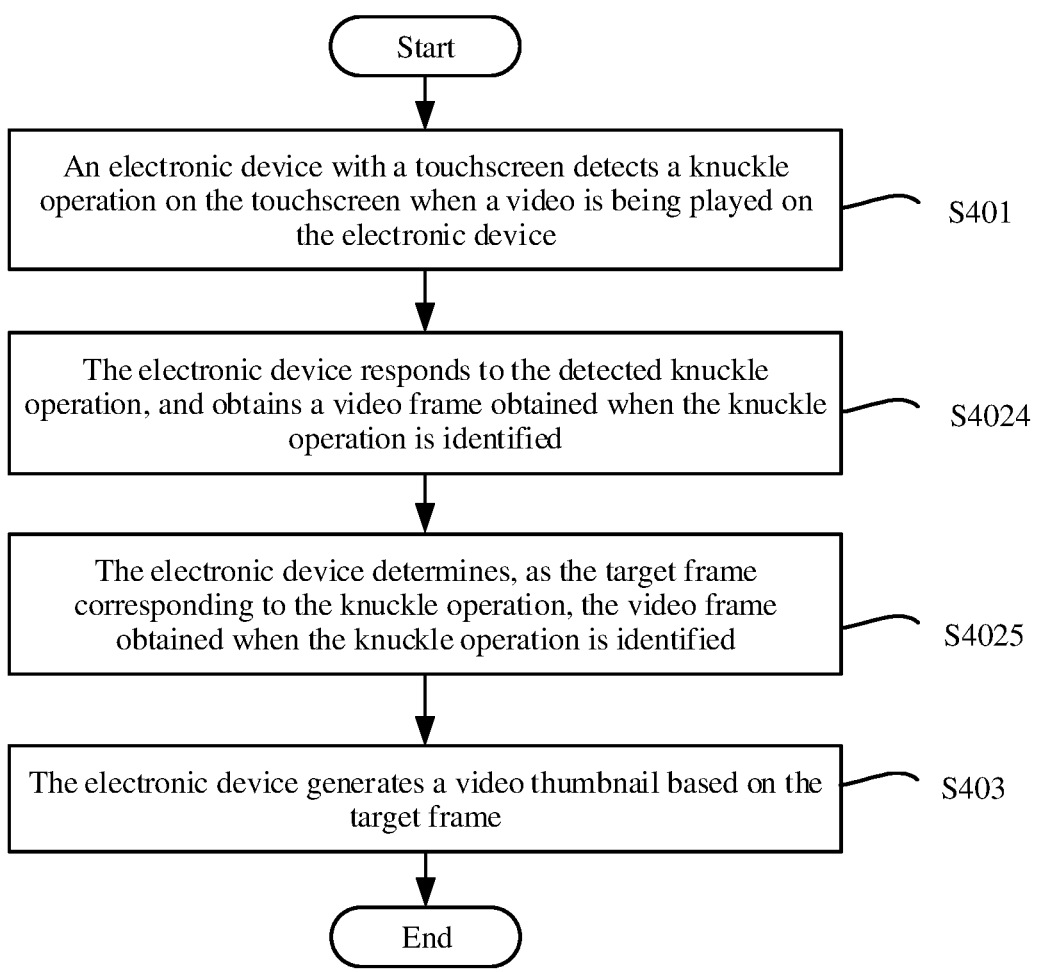
FIG. 9 is a schematic flowchart of still another method for generating a video thumbnail according to an embodiment of the present invention.

For example, optionally, in another implementation, as shown in FIG. 9, step S402 may specifically include the following steps:

S4024. The electronic device obtains a video frame obtained response to the detected knuckle operation when the knuckle operation is identified.

S4025. The electronic device determines, as the target frame corresponding to the knuckle operation, the video frame obtained when the knuckle operation is identified.

Figure 10:
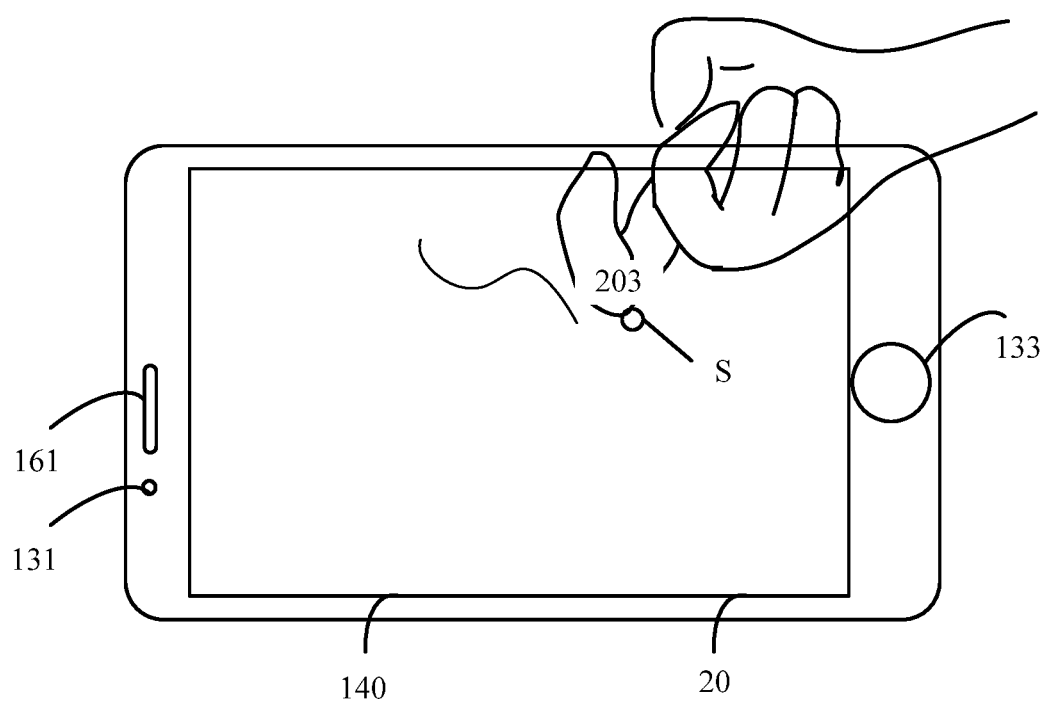
FIG. 10 is another schematic diagram of selecting a target frame by using a knuckle operation according to an embodiment of the present invention.

For example, it is assumed that the electronic device is specifically a mobile phone. As shown in FIG. 10, when a user operates a mobile phone with a screen 140 to play a video, a video playing area 20 may display a currently played video frame. For example, in FIG. 10, the video playing area 20 may display a currently played video frame 24. If the video frame 24 is an image of interest to the user after seeing the image, the user may perform a knuckle operation in an area S in the video playing area 20, for example, continuously knock the area S by using the knuckle 203. In this way, after responding to the detected knuckle operation, the electronic device may directly determine the video frame 24 as the target frame corresponding to the knuckle operation.

A manner of determining a target frame in this embodiment is simpler than a manner of determining a target frame in the embodiment shown in FIG. 7.

Figure 11:
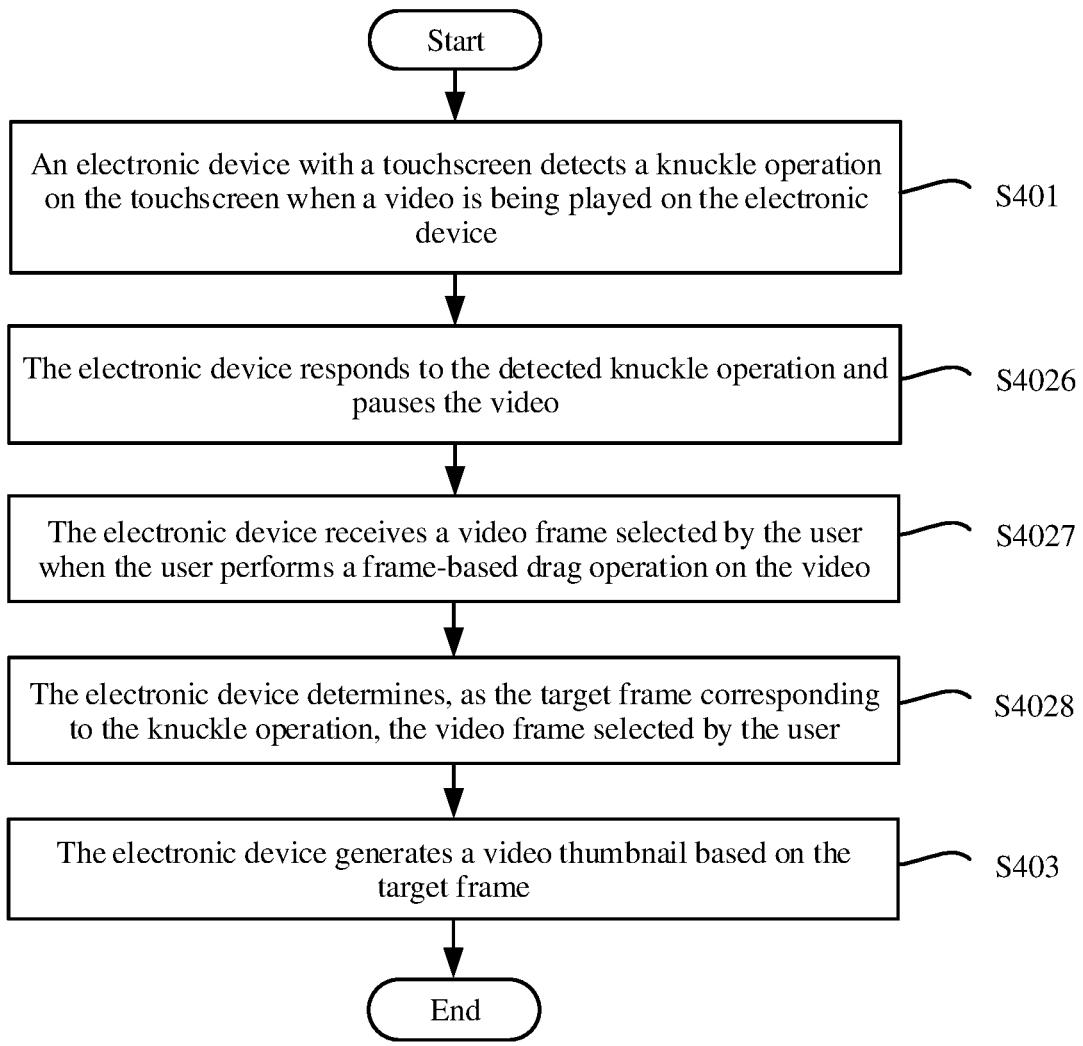
FIG. 11 is a schematic flowchart of still another method for generating a video thumbnail according to an embodiment of the present invention.

Optionally, in another implementation, as shown in FIG. 11, step S402 may specifically include the following steps:

S4026. The electronic device pauses the video response to the detected knuckle operation.

S4027. The electronic device receives a video frame selected by the user when the user performs a frame-based drag operation on the video.

S4028. The electronic device determines, as the target frame corresponding to the knuckle operation, the video frame selected by the user.

Figures 1, 12:
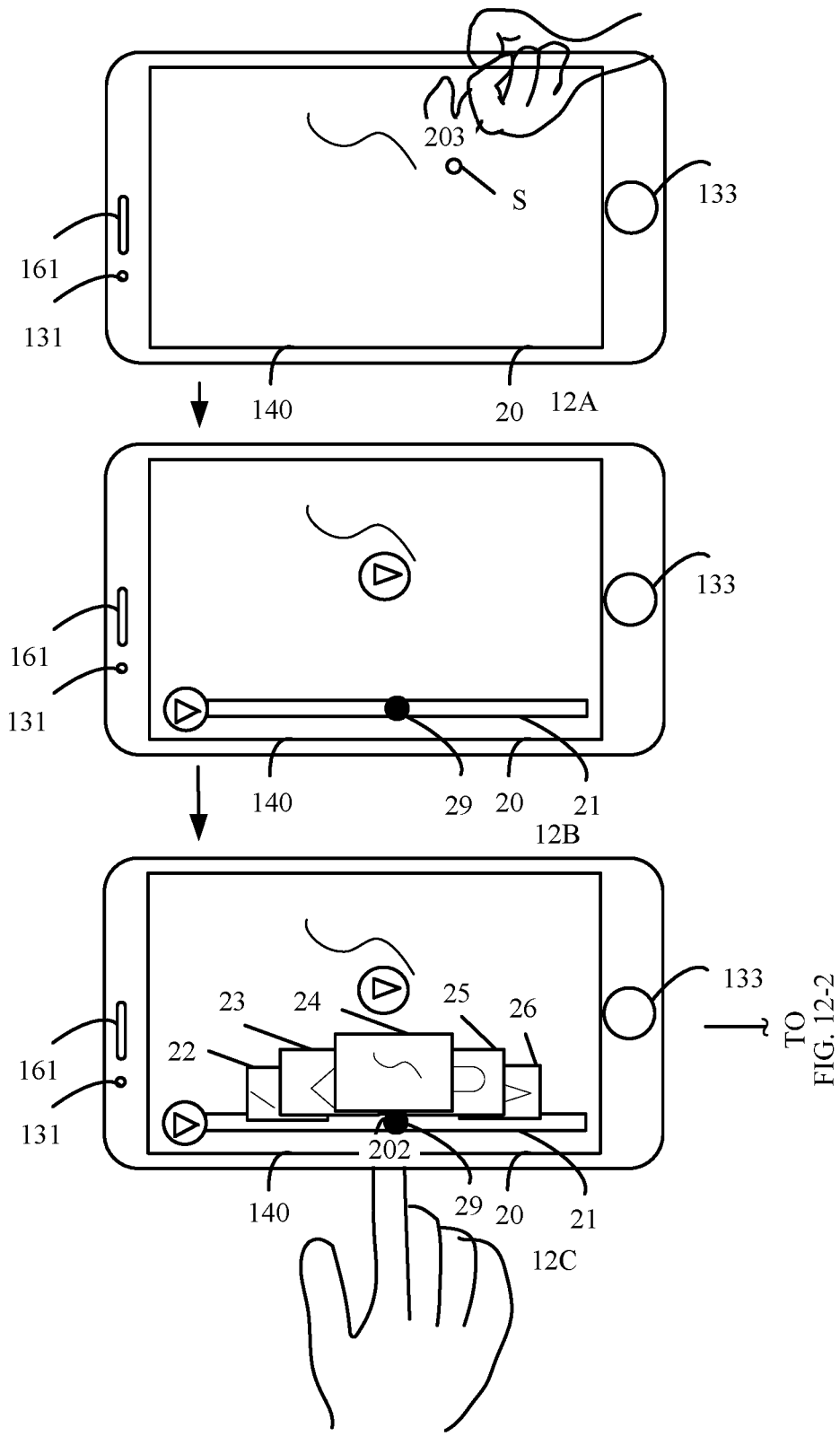
Figures 2, 12:
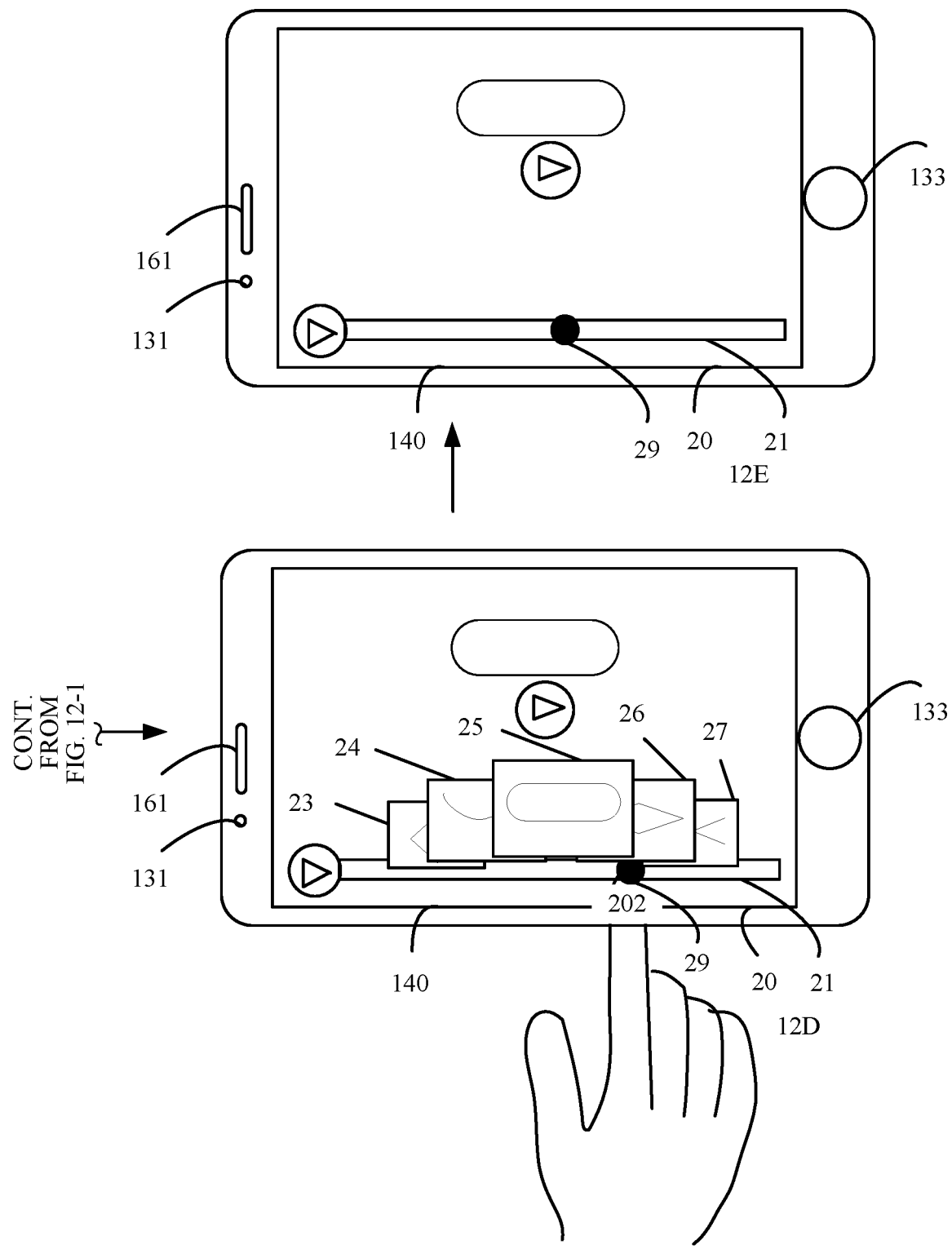

For example, it is assumed that the electronic device is specifically a mobile phone. As shown in FIG. 12A, when a user operates a mobile phone with a screen 140 to play a video, a video playing area 20 may display a currently played video frame. For example, in FIG. 12A, the video playing area 20 may display a currently played video frame 24. If the user hopes to select a video frame near the video frame 24 as the target frame, the user may perform a knuckle operation on the area S in the video playing area 20, for example, continuously knock the area S by using the knuckle 203. In this way, after the electronic device responds to the detected knuckle operation, the video may be paused and a playing screen corresponding to the video frame 24 may be displayed as shown in FIG. 12B. Further, the user may select a target frame by dragging a key 29 on a video progress bar 21. For example, as shown in FIG. 12C, if the user drags the key 29 on the video progress bar 21, a video frame 22, a video frame 23, a video frame 24, a video frame 25, and a video frame 26 are displayed above the video progress bar 21. As shown in FIG. 12D, if the user continues to drag the key 29 on the video progress bar 21, the video frame 23, the video frame 24, the video frame 25, the video frame 26, and a video frame 27 are displayed above the video progress bar 21. If the user is interested in the video frame 25 currently displayed in a playing screen of the video playing area 20, as shown in FIG. 12E, the user may stop dragging the key 29 on the video progress bar 21. In this way, the video frame entered by the user and received by the electronic device is the video frame 25. Further, the electronic device may determine the video frame 25 as the target frame corresponding to the knuckle operation.

According to the method for generating a video thumbnail that is provided in this embodiment of the present invention, in this embodiment of the present invention, when the electronic device detects a knuckle operation on the touchscreen, a target frame corresponding to the knuckle operation may be determined, to generate a video thumbnail based on the target frame. The video thumbnail is generated based on the target frame corresponding to the knuckle operation on the touchscreen, and the knuckle operation is triggered by the user. Therefore, the method for generating a video thumbnail provided in this embodiment of the present invention can meet a requirement of the user on a customized video thumbnail. In this way, key content in the video can be presented and it is convenient for the user to manage video content, thereby improving user experience of a product.

In some other embodiments, to more conveniently generate a video thumbnail, an electronic device automatically (or with participation of a user) generates a video thumbnail after video shooting ends (instead of playing back a stored video). For example, the electronic device shoots a video according to an instruction of the user. After receiving an end instruction of shooting (for example, receiving an operation that the user taps an end key of shooting), the electronic device may generate, based on key content in a shot video, a video thumbnail according to a specified algorithm. For example, 60% of content or video frames in the content of the video are related to a dance performance by someone. In this case, a video thumbnail may be generated based on a video frame related to the dance performance in the shot video. In this way, the user may learn from the video thumbnail that this video is related to a dance performance. For another example, the key content in this video may be determined based on an object (such as a flower or a running kid) corresponding to a location of a focus in the shot video. It may be understood that how to determine key content in a video and automatically generate a video thumbnail based on the key content is not specifically limited in this embodiment of the present invention. In this embodiment, when the user opens a video library, the user sees a video thumbnail related to key content in a shot video. In this way, the user can learn of general content or key content in the video before playing the video. Therefore, user experience is significantly improved. An embodiment of the present invention provides a method for generating a video thumbnail on an electronic device. The method includes: receiving an end instruction of shooting a video; analyzing key content in the video, and capturing, based on the key content, at least one video frame that is in the video and that represents the key content; generating a video thumbnail of the video based on the at least one video frame; and storing the video thumbnail and the video in a memory in the electronic device. The analyzing key content in the video specifically includes: using, as the key content, an object corresponding to a location of a focus in the shot video.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM for short), an erasable programmable read only memory (EPROM for short), an electrically erasable programmable read only memory (EEPROM for short), a register, a hard disk, a mobile hard disk, a compact disc read-only memory (CD-ROM for short), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method, comprising:
    displaying, by an electronic device, a video on a video playing area of a touchscreen of the electronic device, based on a play instruction received from a user;
    detecting, by the electronic device, a knuckle operation on the video playing area of the touchscreen, the knuckle operation comprising the user knocking multiple times on a portion of the video playing area;
    capturing, by the electronic device in response to detecting the knuckle operation, 2N+1 video frames, the 2N+1 video frames comprising a first video frame obtained when the knuckle operation is detected, first N consecutive video frames immediately prior to the first video frame, and second N consecutive video frames immediately following the first video frame, and N being a positive integer;
    displaying, by the electronic device, the 2N+1 video frames over the video playing area of the touchscreen, each video frame of the 2N+1 video frames being displayed in corresponding non-contiguous overlay areas above the video on the video playing area of the touchscreen;
    determining, by the electronic device, a target video frame of the video corresponding to a second video frame selected by the user from the 2N+1 video frames;
    generating, by the electronic device based on the target video frame, a video thumbnail of the video for managing video content; and
    presenting, by the electronic device, the video thumbnail of the video when the user opens a video library.

2. The method according to claim 1, wherein displaying the 2N+1 video frames comprises:
    pausing, by the electronic device, displaying of the video on the video playing area of the touchscreen.

3. The method according to claim 1, wherein generating the video thumbnail of the video comprises storing, by the electronic device, the target video frame in a storage area corresponding to the video, to obtain the video thumbnail.

4. The method according to claim 1, wherein detecting the knuckle operation on the video playing area of the touchscreen comprises:
    detecting, by the electronic device using a sensor, a user operation on the touchscreen;
    extracting, by the electronic device, knuckle feature data;
    identifying, by the electronic device, the knuckle operation using a corresponding algorithm; and
    determining, by the electronic device, whether the knuckle operation was performed on the video playing area of the touchscreen.

5. The method according to claim 4, further comprising:
    prompting, by the electronic device, the user based on determining that the knuckle operation was performed outside the video playing area of the touchscreen.

6. An electronic device, comprising:
    an input device;
    a touchscreen;
    a non-transitory memory storage comprising instructions; and
    one or more processors in communication with the input device, the touchscreen, and the non-transitory memory storage, wherein the one or more processors execute the instructions to:
    receive, using the input device, a play instruction from a user;
    display, based on the play instruction, a video on a video playing area of the touchscreen;
    detect a knuckle operation on the video playing area of the touchscreen, the knuckle operation comprising the user knocking multiple times on a portion of the video playing area;
    capture, in response to detecting the knuckle operation, 2N+1 video frames, the 2N+1 video frames comprising a first video frame obtained when the knuckle operation is detected, first N consecutive video frames immediately prior to the first video frame, and second N consecutive video frames immediately following the first video frame, and N being a positive integer;
    display the 2N+1 video frames over the video playing area of the touchscreen, each video frame of the 2N+1 video frames being displayed in corresponding non-contiguous overlay areas above the video on the video playing area of the touchscreen;

determine a target video frame corresponding to a second video frame selected by the user from the 2N+1 video frames;

generate, based on the target video frame, a video thumbnail of the video for managing video content; and present the video thumbnail of the video when the user opens a video library.

7. The electronic device according to claim 6, wherein instructions to display the 2N+1 video frames comprise further instructions to:

pause display of the video on the video playing area of the touchscreen.

8. The electronic device according to claim 6, wherein the one or more processors execute further instructions to:

store the target video frame in a storage area corresponding to the video, to obtain the video thumbnail.

9. The electronic device according to claim 6, wherein instructions to detect the knuckle operation on the video playing area of the touchscreen comprise further instructions to:

detect, using a sensor, a user operation on the touchscreen;

extract knuckle feature data;

identify the knuckle operation using a corresponding algorithm; and determine whether the knuckle operation was performed on the video playing area of the touchscreen.

10. The electronic device according to claim 9, wherein the non-transitory memory storage stores further instructions that, when executed by the one or more processors, further cause the one or more processors to perform operations comprising:

prompting, by the electronic device, the user based on determining that the knuckle operation was performed outside the video playing area of the touchscreen.

11. A mobile phone, comprising:

a touchscreen;

one or more processors; and a non-transitory memory storing instructions that, when executed by the one or more processors, cause the one or more processors to perform operations comprising:

displaying a video on a video playing area of the touchscreen, wherein the video comprises a thumbnail which is displayable on the touchscreen;

detecting a knuckle operation on the video playing area of the touchscreen, the knuckle operation comprising a user knocking multiple times on a portion of the video playing area;

capturing, in response to detecting the knuckle operation, 2N+1 video frames, the 2N+1 video frames comprising a first video frame obtained when the knuckle operation is detected, first N consecutive video frames immediately prior to the first video frame, and second N consecutive video frames immediately following the first video frame, and N being a positive integer;

pausing the video, and displaying the 2N+1 video frames over the video playing area of the touchscreen, each video frame of the 2N+1 video frames being displayed in corresponding non-contiguous overlay areas above the video on the video playing area of the touchscreen;

determining a target video frame from the 2N+1 video frames of the video in response to detecting a selection operation by the user;

updating the thumbnail of the video using the target video frame; and displaying the target video frame as the thumbnail of the video when the user opens a video library.

12. The mobile phone of claim 11, wherein instructions for updating the thumbnail of the video comprise further instructions for:

storing the target video frame in a storage area corresponding to the video.

13. The mobile phone of claim 11, wherein instructions for detecting the knuckle operation on the video playing area of the touchscreen comprises:

detecting, using a sensor, a user operation on the touchscreen;

extracting knuckle feature data;

identifying the knuckle operation using a corresponding algorithm; and determining whether the knuckle operation was performed on the video playing area of the touchscreen.

14. The mobile phone of claim 13, wherein the non-transitory memory further stores instructions that, when executed by the one or more processors, further cause the one or more processors to perform operations comprising:

prompting the user based on determining that the knuckle operation was performed outside the video playing area of the touchscreen.

* * * * *